United States Patent [19]

Bacardit

[11] Patent Number: 4,594,936
[45] Date of Patent: Jun. 17, 1986

[54] HYDRAULIC DISTRIBUTOR FOR A SERVOMECHANISM WITH REACTION ON THE INPUT COMPONENT

[75] Inventor: Juan S. Bacardit, Barcelona, Spain

[73] Assignee: Bendiberica S.A., Barcelona, Spain

[21] Appl. No.: 668,436

[22] Filed: Nov. 5, 1984

[30] Foreign Application Priority Data

Nov. 18, 1983 [ES] Spain .................................. 527578

[51] Int. Cl.⁴ .................. F15B 13/04; F15B 9/10; F15B 11/10
[52] U.S. Cl. ..................................... 91/51; 91/375 R; 91/467; 137/625.24
[58] Field of Search .................. 91/371, 375 A, 375 R, 91/51, 370, 464, 467; 137/625.21, 625.22, 625.24

[56] References Cited

U.S. PATENT DOCUMENTS

| | | | |
|---|---|---|---|
| 3,465,842 | 9/1969 | Hruska | 91/375 A |
| 3,922,953 | 12/1975 | Strauff | 91/371 |
| 4,335,749 | 6/1982 | Walter | 91/375 A |
| 4,445,422 | 5/1984 | Bishop | 91/375 A |
| 4,459,896 | 7/1984 | Dauvergne et al. | 137/625.21 X |
| 4,461,321 | 7/1984 | Bacardit | 137/625.21 |

Primary Examiner—Robert E. Garrett
Assistant Examiner—Mark Williamson
Attorney, Agent, or Firm—Larry J. Palguta; Ken C. Decker

[57] ABSTRACT

The distributor, typically one having a star-shaped rotor in a disc-shaped stator, incorporates two components, primary and secondary, defining two parallel distribution circuits (10, 10') controlling an assistance actuator (V) and incorporating, in each circuit, three variable restrictions (1-3 or 1'-3'), together with, advantageously, two other parallel reaction circuits (20, 20') with two restrictions in series (4, 5 and 4', 5'). The chamber ($V_1$, $V_2$) of the assistance actuator (V) are joined to the distribution circuits (10, 10'), respectively, between the second (2, 2') and third (3, 3') variable restrictions which create the differential assistance pressure, the central point of the distributor being determined by the first (1, 1') and second (2, 2') variable restrictions.

14 Claims, 7 Drawing Figures

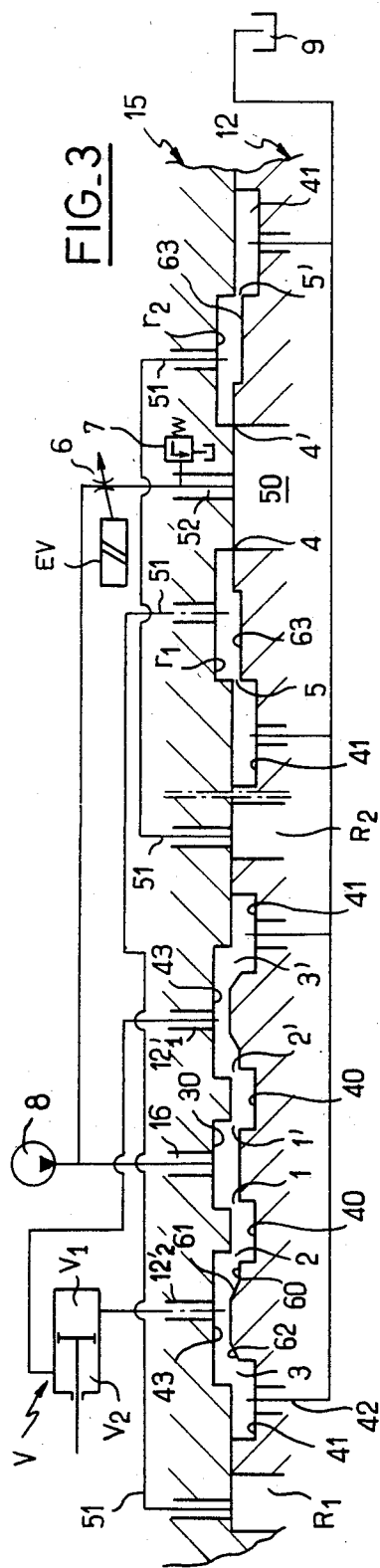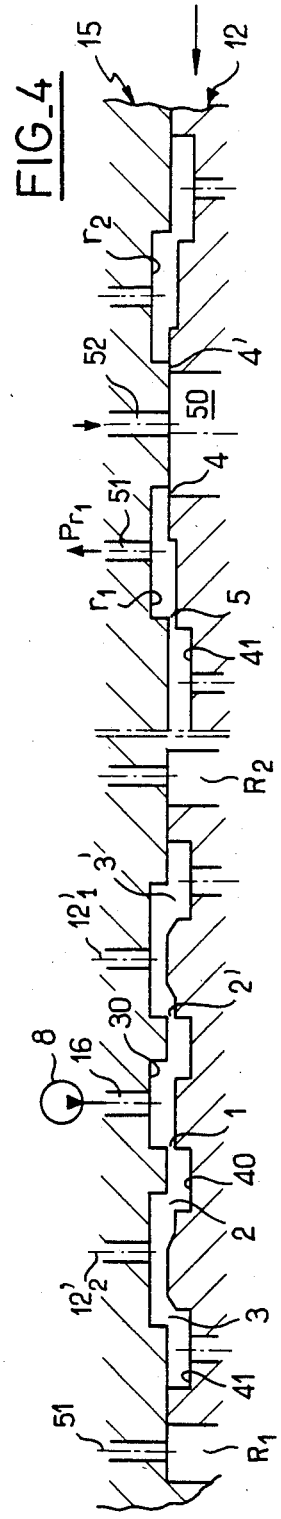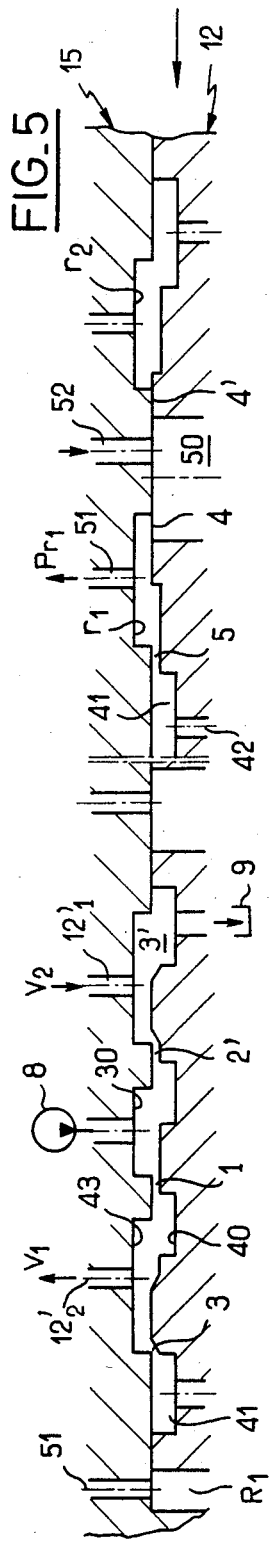

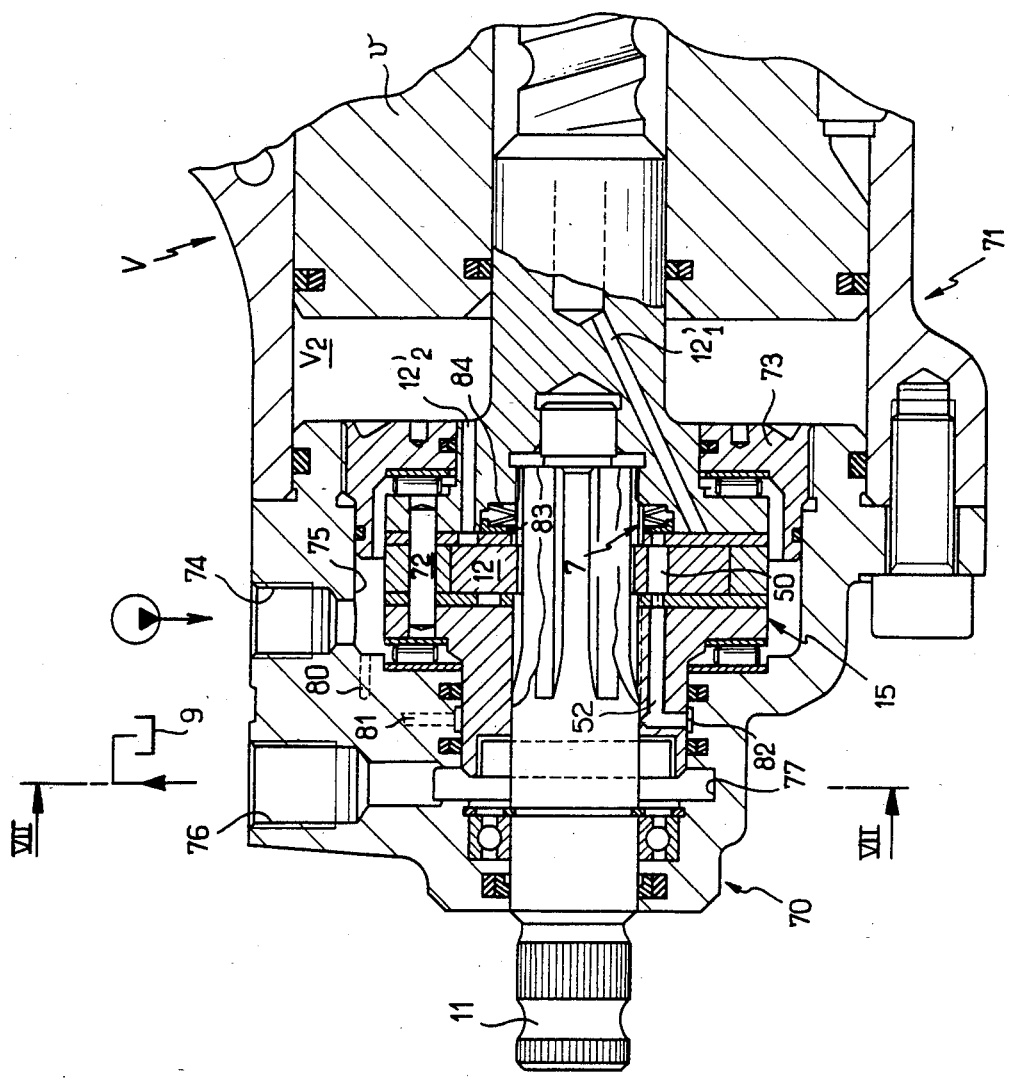
FIG_6

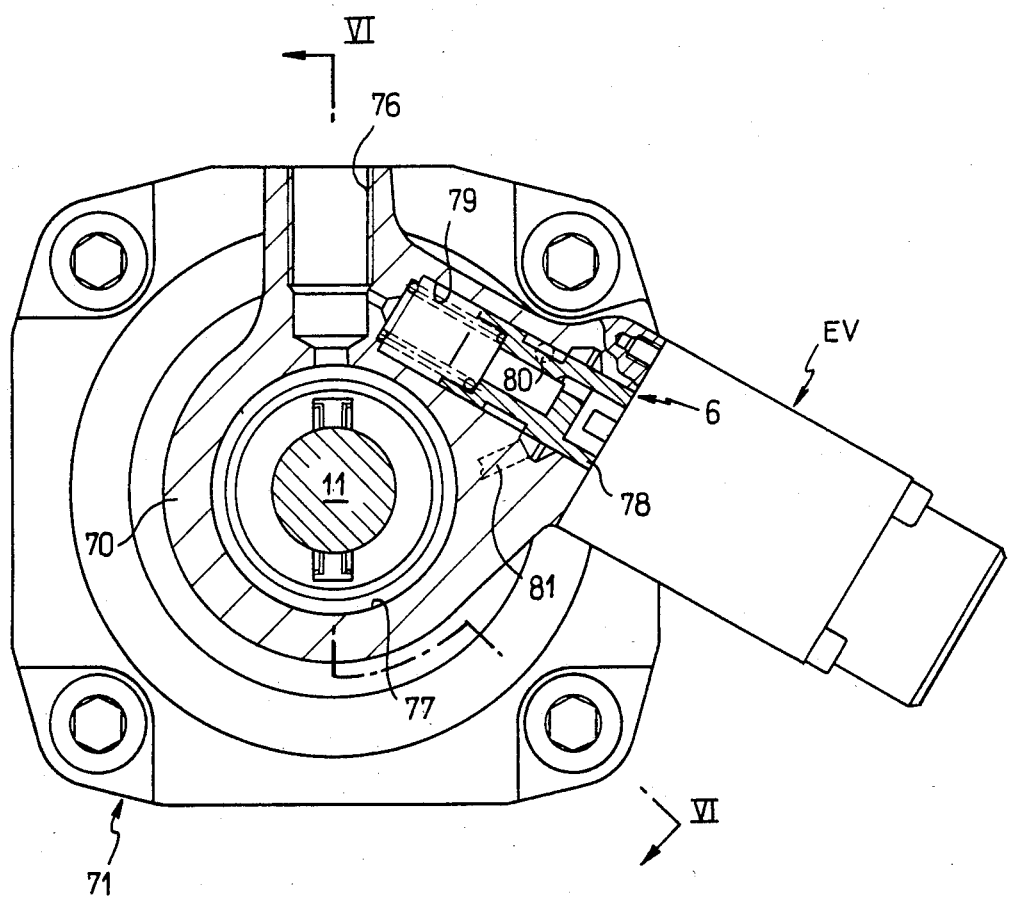
FIG_7

HYDRAULIC DISTRIBUTOR FOR A SERVOMECHANISM WITH REACTION ON THE INPUT COMPONENT

The present invention concerns hydraulic distributors for servomechanisms, particularly for the servo-steering of a motor vehicle, of the type incorporating a primary component, joined to an input actuating component, and a secondary component associated through the intermediary of a coupling with dead travel allowing limited relative displacement between these primary and secondary components on each side of a central position, these primary and secondary components mutually defining at least a first pair of parallel fluid circuits, between a source of pressure and a discharge, each incorporating at least a first, second and third restrictions in series which are capable of being modulated, which are brought into operation during the relative displacement between these two components so as to control a hydraulic assistance device incorporating two opposing chambers joined, respectively, to a circuit corresponding to the first pair of parallel circuits downstream of the first restriction of this circuit.

Hydraulic distributors of this type are described in co-pending U.S. patent application Ser. No. 557,564 filed Dec. 2, 1983 or in U.S. Pat. No. 4,512,238, both in the name of the assignee company. In these distributors, the supply conduits of the opposing chambers of the assistance cylinder are connected, respectively, to the circuits of the first pair of parallel circuits immediately downstream of the first restrictions of these circuits. In operation, independently of the reaction devices which may be associated with them, it is the two associated downstream restrictions 3' and 3 (or 3 and 2' according to the direction of actuation) (assuming that the three restrictions of each circuit are numbered 1, 2, 3 and 1', 2', 3', in order) which first come into operation during a relative displacement between the two primary and secondary components so as to introduce restrictions which are initially substantially identical and small, which causes, in the distributor, a rise in input pressure (together with the reaction input pressure, if the case applies) determining the central point or horizontal starting portion of the actuating torque/output pressure characteristic of the distributor, without creating, however, a differential pressure, between the chambers of the assistance cylinder (that is to say downstream of the first restrictions which until now have produced no effect). Further relative displacement of the primary and secondary components then brings into action the corresponding upstream restriction 1 (or 1'), generally constructed as a chamfered edge of an opening in the rotor, which provides a progressive restriction creating the differential pressure in the assistance cylinder, until, in the pressurized chamber of the cylinder, the maximum pressure of the source is reached when the upstream restriction 1 reaches the closed position (as a result of which the supply is cut off to the downstream portion of the corresponding circuit).

This arrangement, while practical and efficient, presents problems of construction in order to limit, in the control circuits, the appearance of pressure peaks resulting from progressive, then simultaneous, operation of the different restrictions.

The aim of the present invention is to propose a new arrangement of a distributor of the type defined above, having improved operation, and particularly, better dynamic stability.

For this purpose, according to a characteristic of the invention, each chamber of the assistance device is joined to the corresponding fluid circuit of the first pair of parallel fluid circuits between the second and third restrictions of this circuit, the first restrictions introducing, when they are brought into operation under the effect of relative displacement between the primary and secondary components, a substantially constant restriction, the third restrictions introducing for their part, at the time when they become operative, a progressive restriction which is substantially linear.

According to another characteristic of the invention, each second restriction of the circuits of the first pair of parallel circuits introduces, when it is brought into operation, a restriction at first substantially constant and equal to that of the first restriction of the other circuit, simultaneously with the latter, and then progressive substantially simultaneously with the third restriction of the other circuit.

In such an arrangement, it is thus the upstream restriction (1 or 1') of each parallel circuit which, by coming into operation first in the assistance control circuit, determines, with the second restriction of the other circuit (2' or 2), the central point of operation of the distributor (and the reaction input pressure), this same second restriction determining, with the downstream restriction of the first circuit (3 or 3'), the differential assistance pressure (together with the proportional reaction exerted on the primary component).

This arrangement also allows, in a distributor of the type having a star-shaped rotor, in which the restrictions are formed by the cooperating edges of adjacent cavities in the opposing surfaces of the stator and of the rotor, better construction of the cavities allowing greater fluid flow during the operating phase of the distributor.

Thus, according to another characteristic of the invention, in a distributor in which the primary component is a flat star-shaped rotor mounted so as to rotate in a complementary disc-shaped housing of a cylindrical stator forming the secondary component, the restrictions of the circuits of the pair of parallel circuits being defined by the cooperating edges extending substantially radially from windows formed in the axially facing surfaces of the rotor and of the stator, the first, second, and third restrictions of the first pair of circuits are formed in the arms of the star-shaped rotor.

Such a distributor construction enables the chambers defined in the disc-shaped housing of the stator on each side of each arm of the star-shaped rotor to be used as opposing reaction chambers, as also described in co-pending U.S. patent application Ser. No. 557,564 mentioned above, in which, however, the reaction distribution valve means are formed in the arms of the rotor, in the region of the outer periphery of the latter.

Thus, according to another characteristic of the invention, the hydraulic distributor of the invention incorporates a reaction device with opposed chambers which is coupled to the primary component and actuated by reaction pressures supplied from the pressure source through a fourth set of restrictions arranged, respectively, in a second pair of parallel circuits defined by the primary and secondary components and brought into operation first, during relative displacement between these primary and secondary components.

Another aim of the present invention is to propose a distributor of this type, of compact and robust construction.

To achieve this, according to another characteristic of the invention, the fourth restrictions of the second pair of circuits are formed in the base of the arms of the star-shaped rotor.

Other characteristics and advantages of the present invention will emerge from the following description of an embodiment, given by way of illustration but not limiting in any way, with reference to the accompanying drawings, in which:

FIGS. 3, 4 and 5 are developed views of the section along the line III—III of the distributor shown in FIG. 2, which show three successive phases of operation of the distributor;

FIG. 6 is a view in partial longitudinal section along the line IV—IV shown in FIG. 7 of a steering box using a hydraulic distributor according to FIG. 2; and FIG. 7 is a view in transverse section on the section plane VII—VII shown in FIG. 6.

Figure 1:
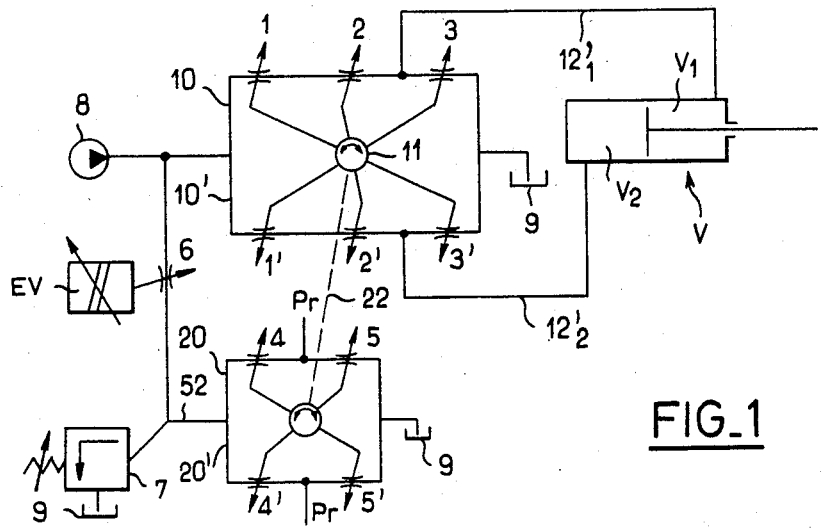
FIG. 1 is a schematic diagram showing the operation of a hydraulic distributor according to the invention.

As shown diagrammatically in FIG. 1, the hydraulic distributor, according to a known arrangement, incorporates two parallel circuits 10, 10' between a source of pressure 8 (hydraulic pump or any other device) and a discharge 9, circuits in each of which three restriction devices, or restrictions capable of being modulated, 1, 2 and 3; 1', 2' and 3', respectively, are arranged in series in such a way as to be actuated simultaneously by the input component 11 of the distributor controlling the two working chambers $V_1$ and $V_2$ of the assistance actuator V. In the diagram shown, the distributor is associated with a reaction distributor device also incorporating two parallel circuits 20 and 20' between the source of pressure 8 and the discharge 9, each of these circuits 20 and 20' being provided respectively with two restrictions in series 4 and 5, 4' and 5', actuated, through the intermediary of a transmission shown at 22, from the input control component 11 of the assistance distributor. A variable restriction 6 is interposed between the source of pressure 8 and the reaction distributor device, and is controlled externally by an electromagnetic actuator EV which is controlled, for example, by parameters linked to the running of the engine or of the vehicle and provided by the computer on board the vehicle. A branch is arranged between this variable restriction 6 and the assistance distributor device, leading to the input of a valve for the regulation or relief of pressure 7 whose output terminates in the discharge 9 and which is subjected to the pressure of a spring whose force is adjusted in order to determine the maximum required reaction on the assistance distributor. The sequential operation of the variable restrictions 4, 5 and 4', 5' of the reaction distributor device creates a modulated reaction pressure $P_r$ between the two restrictions in series of each parallel circuit 20 or 20', which is transmitted to opposing reaction chambers exerting upon the input control component 11 of the assistance distributor a modulated reaction opposing its displacement, as will be seen below.

In accordance with the invention, the chambers $V_1$ and $V_2$ of the assistance actuator V are joined to the assistance distributor by conduits $12'_1$ and $12'_2$, respectively, connected to the corresponding distribution circuit 10 or 10' between the two downstream variable restrictions 2 and 3, 2' and 3', respectively. Consequently, these variable restrictions 1-3 and 1'-3' are arranged in such a way that when the assistance distributor comes into operation, the restrictions 1 and 2' (or 1' and 2, in the other direction) are brought into operation simultaneously to create, in the distributor, an assistance input pressure (and, as a result of the synchronized actuation of the variable restrictions 4 and 5, a reaction pressure), without creating, however, a pressure differential between the chambers $V_1$ and $V_2$ of the assistance actuator V. By continuing to actuate the input control component 11, the restrictions 2' and 3 (or 2 and 3') then create the pressure differential providing, via the actuator V, the required assistance.

FIGS. 2 to 5 show a practical construction of the system shown in FIG. 1. In these Figures, the assistance distributor is of the type with a flat star-shaped rotor 12 incorporating arms 13 extending radially outwards and entering a complementary disc-shaped housing 14 formed in a cylindrical stator 15, in which the rotor 12 can rotate in sealed sliding over a limited angular range. Radial passages 16 are arranged in the stator 15, joined to the source of pressure 8 and opening into the internal axial surfaces of the stator through supply openings 30 which are faced, in the central rest position shown in FIGS. 2 and 3 by a central covering portion of the arms 13 of the rotor 12 between two intermediate symetrical openings which are substantially trapezoidal 40 formed in the arms 13 of the rotor. The cooperating edges of each opening 30 and of the openings 40 form the restrictions 1 and 1'. As shown in FIGS. 3 to 5, the adjacent edges of the openings 40 form abrupt reliefs and arrange permanently a restricted passage with the corresponding edge, also abrupt, of the opening 30.

On each side of the intermediate openings 40, each arm 13 of the rotor 12 incorporates returning openings 41 extending radially inwards so as to communicate with the internal space 42 arranged between the central hub portion of the rotor 12 and the input control shaft 11 to which the rotor is coupled. Between the adjacent openings 40 and 41, the stator 15 incorporates a distribution opening whose configuration is essentially trapezoidal 43, and whose radial lateral edges form, together with the corresponding edges of the openings 40 and 41 of the rotor 12, the variable restrictions 2 and 3 (or 2' and 3'), respectively. The openings 43 on each side of each input opening 30 communicate with the chambers $V_1$ and $V_2$ of the assistance actuator V through the conduits 12 and 12', respectively, also shown in FIG. 2.

In accordance with a feature of the invention, an inner opening 50 is arranged in this rotor, in the region of the base of each arm 13 of the rotor 12, radially nearer the center relative to the central cover separating the rotor openings 40, the inner opening 50 having a closed trapezoidal shape with a small radial width. Two symmetrical reaction openings $r_1$ and $r_2$ are formed in the stator 15 on each side of this opening 50, which communicate, through conduits 51 formed in the stator, with a corresponding reaction chamber $R_1$ or $R_2$, respectively, defined in the housing 14 of the stator 15 on each side of each arm 13 of the rotor 12. A conduit 52 opens into the covering portion of the stator which is not cut away between the two openings $r_1$ and $r_2$ of the rotor at the center of the opening 50 of the rotor so as to supply the latter with the supply pressure coming from the pressure source 8 via the variable restriction 6.

Figure 2:
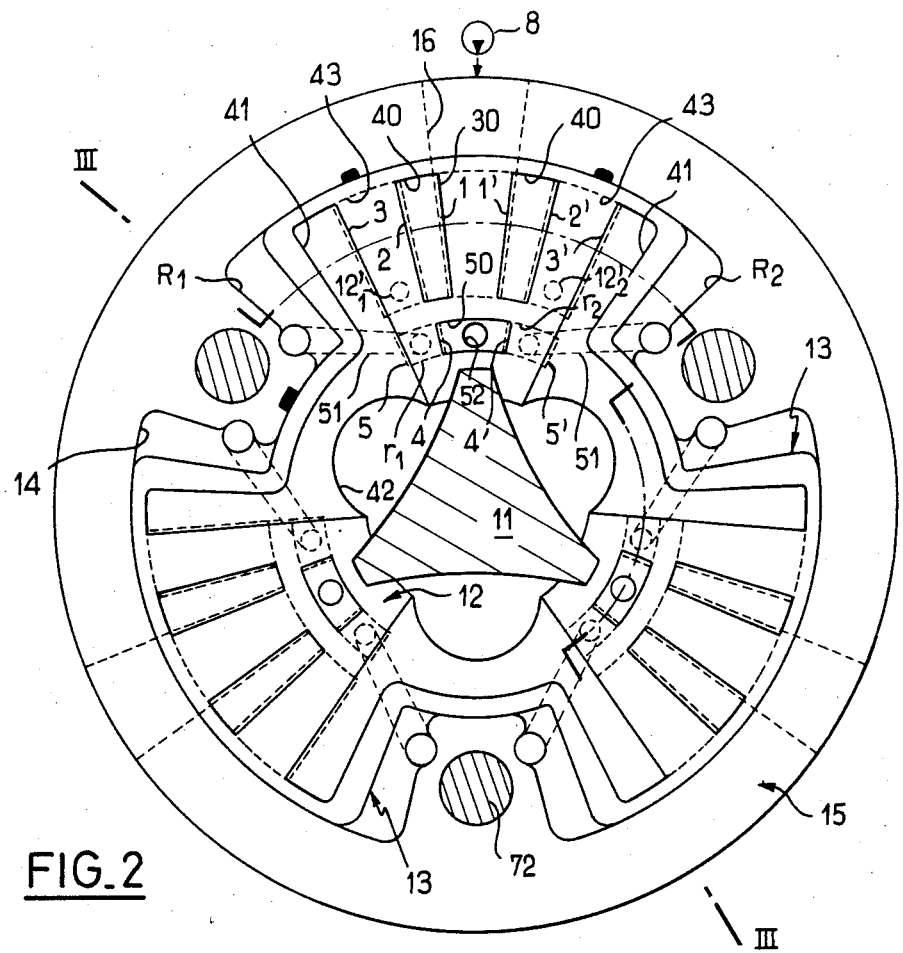
FIG. 2 is a diagrammatic view in transverse section of a distributor for servo-steering control with a star-shaped rotor in accordance with the invention.

As shown clearly in FIGS. 2 and 3, the edges of the openings $r_1$ and $r_2$ define, firstly with the opening 50, and secondly with the radial inward extensions of the openings 41, the reaction restrictions 4, 5 and 4' and 5'. In the rest position shown in FIGS. 2 and 3, the cooperating edges of the openings 50 and $r_1$ or $r_2$ are such that the restrictions 4 and 40' are closed and that, as soon as the rotor 12 is displaced relative to the stator 15, one of these restrictions 4 or 4' opens immediately, the other remaining closed (cf FIGS. 4 and 5).

Reference is now made to FIG. 3 to describe the shape of the edges of the openings of the rotor providing the sequence of operation of the restrictions 1-3 or 1'-3' described in greater detail (the edges of the openings of the stator consisting advantageously of rectangular shoulders). The edges of the openings 40 which are distant from the input opening 30 of the stator are formed so as to incorporate a flat 60 which is substantially coplanar with the covering portion of the rotor separating these two openings 40, and then a chamfer 61. The edge of the openings 41 which is directed towards the input opening 30 of the stator incorporates, in the region of the distribution openings 43 of the stator, a chamfer 62, whereas this edge incorporates, in the region of the openings $r_1$ or $r_2$, a prominent flat 63 extending, in the rest position, over the major portion of the corresponding opening $r_1$ or $r_2$.

In this way, as shown clearly in the sequence of FIGS. 3 to 5, the restrictions which first come into operation are the restrictions 4 or 4' (the restrictions 5 or 5' maintaining a substantially constant restriction). The restrictions 1 and 2' come next into operation (for the assumed displacement shown in FIGS. 4 and 5). The restriction 1 maintains a substantially constant restriction, and the same applies to the restriction 2', taking into account the flat 60, in this phase of operation. As shown in FIG. 5, the restriction 3 comes next into operation, introducing a progressive restriction which is substantially linear, and the same then applies to the restriction 2', owing to the chamfer 61. It is thus understood, that in the first configuration of FIG. 4, the pressure in the input opening 30 rises (in the same way as the pressure in the opening 50) without creating, however, a pressure differential between the distribution openings 43 of the stator. On the other hand, in the configuration shown in FIG. 5, owing to the restrictions introduced by the restrictions 3 and 2', the pressure in the input opening 30 is transmitted to the chamber $V_1$ of the actuator, of which the chamber $V_2$ is drained towards the discharge 9 via the wide open restriction 3', the reaction pressure in the opening $r_1$ and the reaction chamber $R_1$ being proportional to the pressure generated in the chamber $V_1$ of the assistance actuator. The operation in the reverse direction from that shown in FIGS. 4 and 5 is symmetrical in every detail.

The hydraulic assistance distributor with incorporated reaction device shown in FIG. 2 is shown by way of illustration in FIGS. 6 and 7, built into the cover 70 of a compact servo-steering box 71 also forming the assistance cylinder V of which the piston v is seen coupled, through the intermediary of a system incorporating a screw and circulating balls, to the stator 15 enclosing the star-shaped rotor 12 and consisting, in the example shown, of two end components and an intermediate annular ring coupled in rotation by pins 72 and held so as to bear against the bottom of the cover and an inner bulkhead plate 73 through the intermediary of thrust rollers. An input for fluid under pressure 74 is formed in the cover 70, opening into an internal cavity 75 of the cover 70 housing the hydraulic distributor, and with which radial passages 16 of the stator 15 thus communicate. A return opening 76 is also arranged in the cover 70, communicating with an internal annular chamber 77 surrounding the input shaft 11 and into which the internal axial return passages 42 of the distributor open. As shown in FIG. 7, also arranged in the cover 70 is the variable restriction 6, of which the plunger 78, controlled by the electromagnetic actuator EV, slides in a bore 79 communicating with the return opening 76 and with the internal cavity 75 through a conduit 80. The pressure in the modulation chamber of the variable restriction 6 is transmitted, through a conduit 81, to an annular groove 82 formed in the cover 70 around the front component of the stator 15, then from there to the opening 50 of the rotor through the passage 52. In the particular embodiment shown in FIG. 6, the calibrated valve for limiting the reaction pressure 7 consists of a ring forming a valve 83 pushed by elastic washers 84 forming a calibration spring, this assembly being situated in an internal cavity of the internal end component of the stator 15 facing the internal openings 50 of the rotor and the reaction openings $r_1$ and $r_2$ of the stator.

I claim:

1. A hydraulic distributor for a fluid operated servomechanism, more particularly for the servo-steering of a motor vehicle, comprising a primary component coupled to an input actuating component, and a secondary component, said primary and secondary components mutually couplable through a lost-motion coupling allowing a limited relative displacement between said primary and secondary components on each side of a central rest position, said primary and secondary components mutually defining at least one first pair of parallel fluid circuits between a source of pressure and a reservoir, each said circuit including at least first, second and third restriction means arranged in series in a direction of flow between said source of pressure and said reservoir and operable as a result of said relative displacement between said primary and secondary components so as to control a hydraulic assistance device having two opposing chambers each in fluid connection with a respective circuit of said first pair of parallel fluid circuits downstream of said first restriction means, wherein each said chamber of said assistance device is in fluid communication with said respective circuit between said second and third restriction means of said respective circuit, said first restriction means when brought into throttling operation adapted to introduce in said respective circuit a restriction of fluid flow which is substantially constant during said relative displacement, said third restriction means when brought into throttling operation adapted to introduce in said respective circuit a progressive restriction of fluid flow and which progressive restriction varies substantially linearly with said relative displacement.

2. The hydraulic distributor according to claim 1, wherein each second restriction means when brought into throttling operation introduces in the respective parallel fluid circuit a restriction of fluid flow which is initially substantially equal to the restriction of fluid flow effected by the first restriction means of the other respective parallel fluid circuit, and then subsequently substantially equal to the progressive restriction of fluid flow effected by the third restriction means of the other respective circuit.

3. The hydraulic distributor according to claim 1, further including a reaction device having opposed reaction chambers and coupled to the primary component and actuated by reaction pressures supplied from said pressure source through fourth restriction means arranged, respectively, in a second pair of parallel fluid circuits further defined by said primary and secondary components, said fourth restriction means being initial ones of the restriction means brought into throttling operation as a result of said relative displacement between said primary and secondary components.

4. The hydraulic distributor according to claim 3, wherein said primary component is a flat star-shaped rotor having outwardly extending arms and mounted so as to rotate in a complementary disc-shaped housing of a cylindrical stator forming said secondary component, said restriction means each being defined by cooperating, substantially radially extending lateral edges of openings formed in respective axially facing surfaces of said rotor and stator.

5. The hydraulic distributor according to claim 4, wherein said reaction chambers are formed by portions which are disposed radially outwardly of said housing and on each side of each arm of said star-shaped rotor.

6. The hydraulic distributor according to claim 5, wherein said openings in said rotor which define said first, second, and third restriction means of said first pair of parallel fluid circuits are formed in said arms of said star-shaped rotor.

7. The hydraulic distributor according to claim 6, wherein said fourth restriction means of said second pair of parallel fluid circuits are defined by openings formed in radially inward portions of said arms of said star-shaped rotor.

8. The hydraulic distributor according to claim 7, wherein the circuits of said second pair of parallel fluid circuits each incorporate fifth restriction means arranged between an associated fourth restriction means and said reservoir.

9. The hydraulic distributor according to claim 8, wherein said first restriction means are each defined between at least one supply opening in said stator and a peripheral intermediate opening disposed in said rotor on a side of said supplying opening, each said second restriction means being defined between the intermediate opening in said rotor and a corresponding distribution opening formed in said stator and the distribution opening being connected to a respective chamber of said assistance device, each said third restriction means being defined between said corresponding distribution opening in said stator and at least one return opening formed in said rotor, the return opening extending radially inwardly and opening into a central return passage of the distributor.

10. The hydraulic distributor according to claim 9, wherein said fourth restriction means are each defined between an initially peripherally closed inner opening in said rotor and a reaction opening formed in said stator on a side of the inner opening in said rotor, the inner opening disposed radially inwardly from said intermediate openings in said rotor and the reaction openings each communicating permanently with an associated reaction chamber and selectively with an associated return opening in said rotor via said fifth restriction means.

11. The hydraulic distributor according to claim 3, further comprising an externally modulable restriction means between said source of pressure and said second pair of parallel fluid circuits.

12. The hydraulic distributor according to claim 11, further comprising a valve for limiting reaction pressure and arranged between said externally modulable restriction and said second pair of parallel fluid circuits.

13. The hydraulic distributor according to claim 12, wherein said valve for limiting the reaction pressure is disposed within the stator.

14. The hydraulic distributor according to claim 13, wherein said valve for limiting the reaction pressure comprises a ring forming a valve biased axially by elastic means and situated to face said inner openings in said rotor and said reaction openings in said stator.

* * * * *